United States Patent
Ignaszewski (10) Patent No.: US 6,675,297 B1
(45) Date of Patent: Jan. 6, 2004

(54) METHOD AND APPARATUS FOR GENERATING AND USING A TAMPER-RESISTANT ENCRYPTION KEY

(75) Inventor: Michael Ignaszewski, Fremont, CA (US)

(73) Assignee: Sigma Designs, Inc., Milpitas, CA (US)

( * ) Notice: Subject to any disclaimer, the term of this patent is extended or adjusted under 35 U.S.C. 154(b) by 0 days.

(21) Appl. No.: 09/263,383

(22) Filed: Mar. 5, 1999

Related U.S. Application Data
(60) Provisional application No. 60/124,083, filed on Mar. 1, 1999.

(51) Int. Cl.[7] .............................. G06F 11/30; H04L 9/00
(52) U.S. Cl. ...................... 713/190; 713/194; 380/277; 380/278; 380/279; 380/44
(58) Field of Search ................................. 713/194, 190; 380/44, 277, 278–279

(56) References Cited

U.S. PATENT DOCUMENTS

| | | | | |
|---|---|---|---|---|
| 4,562,305 A | * | 12/1985 | Gaffney, Jr. .................. | 713/190 |
| 4,675,612 A | | 6/1987 | Adams et al. | |
| 4,713,621 A | | 12/1987 | Nakamura et al. | |
| 4,823,260 A | | 4/1989 | Imel et al. | |
| 4,876,660 A | | 10/1989 | Owen et al. | |
| 5,142,380 A | | 8/1992 | Sakagami et al. .......... | 358/432 |
| 5,412,723 A | * | 5/1995 | Canetti et al. ............... | 380/277 |
| 5,528,309 A | | 6/1996 | Nguyen ....................... | 348/587 |
| 5,574,572 A | | 11/1996 | Malinowski et al. ........ | 358/451 |
| 5,590,200 A | * | 12/1996 | Nachman et al. ............. | 380/44 |
| 5,638,130 A | | 6/1997 | Linzer ......................... | 348/445 |
| 5,650,824 A | | 7/1997 | Huang ......................... | 348/453 |
| 5,719,511 A | | 2/1998 | Le Cornec et al. | |
| 5,832,120 A | | 11/1998 | Prabhakar et al. .......... | 382/233 |
| 5,892,899 A | * | 4/1999 | Aucsmith et al. ............. | 380/30 |
| 5,905,799 A | * | 5/1999 | Ganesan ....................... | 380/21 |
| 5,982,459 A | | 11/1999 | Fandrianto et al. ...... | 348/845.2 |
| 5,991,399 A | * | 11/1999 | Graunke et al. ............. | 380/279 |

FOREIGN PATENT DOCUMENTS

WO    WO 9210911 A    6/1992

OTHER PUBLICATIONS

Bruce Schneier, Appled cryptography 1996, Katherine Schowalter, second edition, pp. 447–454.*

Tsai Y T: "Color Image Compression for Single–Chip Cameras" IEEE Transactions on Electron Devices, vol. 38, No. 5, May 1, 1991, pp. 1226–1232, XP000200683, see abstract; figures 1,6.

* cited by examiner

*Primary Examiner*—Gilberto Barrón
*Assistant Examiner*—Kambiz Zand
(74) *Attorney, Agent, or Firm*—Swernofsky Law Group PC (57) ABSTRACT

The present invention increases the difficulty of reverse engineering sensitive information protected by an encryption algorithm by increasing the difficulty associated with tracing the code that generates the key or the encryption algorithm. This is accomplished by generating the key, used to encrypt and decrypt the sensitive information, as a function of the program instruction values of the procedures used to generate the key and perform the decryption of the sensitive information. Thus, if the key generation code or the decryption code is modified (such as (but without limitation) by placement of a breakpoint, a trace function, or a halt instruction in the code) the resulting key will be different from the key used to encrypt the sensitive information and the decryption attempt will fail.

12 Claims, 6 Drawing Sheets

METHOD AND APPARATUS FOR GENERATING AND USING A TAMPER-RESISTANT ENCRYPTION KEY

This application claims priority to copending provisional application No. 60/124,083 entitled A Method and Apparatus for Generating and Using a Tamper-Resistant Encryption Key, filed Mar. 1, 1999, by the same inventor.

BACKGROUND OF THE INVENTION

1. Field of the Invention

This invention relates to the implementation of an encryption mechanism for accessing sensitive information in a computer, computerized device, or system containing a central processing unit (CPU).

2. Background

Encryption is useful to protect information from unauthorized others. However, encryption technology, no matter how good, will not protect against attacks directed toward flawed implementations of the technology. Encryption technologies use computer-implemented algorithms that use a key to process the information that is to be encrypted or decrypted. No matter how strong the encryption algorithm, or how large the key, if the key is predictable, or if the key can be determined, the protection sought to be provided by the encryption will fail.

Encryption techniques are well known in the art. Implementation of encryption techniques is difficult and often subject to indirect attacks (that is, attacks directed not at the encryption algorithm or encrypted data, but rather at the encryption key).

One approach attackers use when attacking an encryption schema is that the attacker will attempt to interrupt the execution of the encryption algorithm by using breakpoints or execution trace mechanisms. The attacker is then able to determine the encryption algorithm and the techniques used to generate the key. For example, an attacker using these methods will easily find the key if the key is stored in a database (such as the Windows registry or the Macintosh desktop), or if the key is stored in the encryption algorithm itself.

This problem increases the risk to providers of proprietary programming because their proprietary programming can often be discovered (reverse engineered) and disseminated to others thus affecting the revenue potential of owner of the proprietary programming.

Other complementary approaches to increase the resilience of encryption code to an attack is to execute the encryption code on the stack, to write the encryption code as self modifying code, and other known techniques. These techniques can be used with the invention. Thus, it would be advantageous to increase the difficulty associated with determining the encryption key for an encryption algorithm.

SUMMARY OF THE INVENTION

The present invention increases the difficulty of reverse engineering sensitive information protected by an encryption algorithm by increasing the difficulty associated with tracing the code that generates the key or applies the encryption algorithm. This is accomplished by generating the key, used to encrypt and decrypt the sensitive information, as a function of the program instruction values of the procedures used to generate the key and/or perform the decryption of the sensitive information. Thus, if the key generation code or the decryption code is modified (such as (but without limitation) by placement of a breakpoint, a trace function, or a halt instruction in the code) the resulting key will be different from the key used to encrypt the sensitive information and the decryption attempt will fail.

One aspect of the invention is a computer controlled method for encrypting sensitive information with a tamper-resistant key. The method includes a step for determining the tamper-resistant key responsive to program instruction values. These program instruction values are to be included within at least one key domain. The program instruction values are to be executed when decrypting the sensitive information. Another step is that of encrypting the sensitive information using the tamper-resistant key to create an encrypted version of the sensitive information. Yet another step, is that of storing the encrypted version and the program instruction values. The encrypted version is decrypted when access is needed to the sensitive information.

Another aspect of the invention is a computer controlled method for decrypting sensitive information with a tamper-resistant key. One step of the method is that of determining the tamper-resistant key by executing program instruction values included within at least one key domain. The tamper-resistant key is a function of the program instruction values executed to determine the tamper-resistant key. Another step is that of decrypting an encrypted version of the sensitive information using the tamper-resistant key so determined.

Yet another aspect of the invention, is an apparatus that includes a CPU and memory. This apparatus includes a key determination mechanism used to determine the tamper-resistant key as a function of the program instruction values in at least one key domain. The instruction values are to be executed when decrypting the sensitive information. The apparatus also includes an encryption mechanism that encrypts the sensitive information using the tamper-resistant key to create an encrypted version of the sensitive information. In addition, the apparatus also includes a storage mechanism used to store the encrypted version and the program instruction values.

Yet another aspect of the invention, is a computer program product that includes a computer usable storage medium having computer readable code embodied therein for causing for causing a computer to encrypt sensitive information with a tamper-resistant key. When executed on a computer, the computer readable code causes the computer to effect a key determination mechanism, an encryption mechanism, and a storage mechanism. Each of these mechanisms having the same functions as the corresponding mechanisms for the previously described apparatus.

Still another aspect of the invention is an apparatus for decrypting the sensitive information using a tamper-resistant key. The apparatus includes a key determination mechanism for determining the tamper-resistant key by executing program instructions included within at least one key domain. The tamper-resistant key is a function of the program instruction values. The apparatus also includes a decryption mechanism that decrypts an encrypted version of the sensitive information using the tamper-resistant key.

Yet another aspect of the invention, is a computer program product that includes a computer usable storage medium having computer readable code embodied therein for causing for causing a computer to for causing a computer to decrypt sensitive information with a tamper-resistant key. When executed on a computer, the computer readable code causes the computer to effect a key determination mechanism, and a decryption mechanism. Each of these mechanisms having the same functions as the corresponding mechanisms for the previously described apparatus.

DESCRIPTION OF THE PREFERRED EMBODIMENTS

Notations and Nomenclature

The following 'notations and nomenclature' are provided to assist in the understanding of the present invention and the preferred embodiments thereof.

Key domain

A key domain is a portion of the code used to develop the Tamper Resistant Key or to use a key to decrypt the sensitive information. Thus, one key domain can be that of the procedure that determines the key. Another key domain can be the procedure that decrypts the sensitive info.

Procedure

A procedure is a self-consistent sequence of computerized steps that lead to a desired result. These steps are defined by one or more computer instructions. These steps are performed by a computer executing the instructions that define the steps. Thus, the term "procedure" can refer to a sequence of instructions, a sequence of instructions organized within a programmed-procedure or programmed-function, or a sequence of instructions organized within programmed-processes executing in one or more computers. A procedure also encompasses logic circuits that perform the method steps.

Description

Figure 1A:
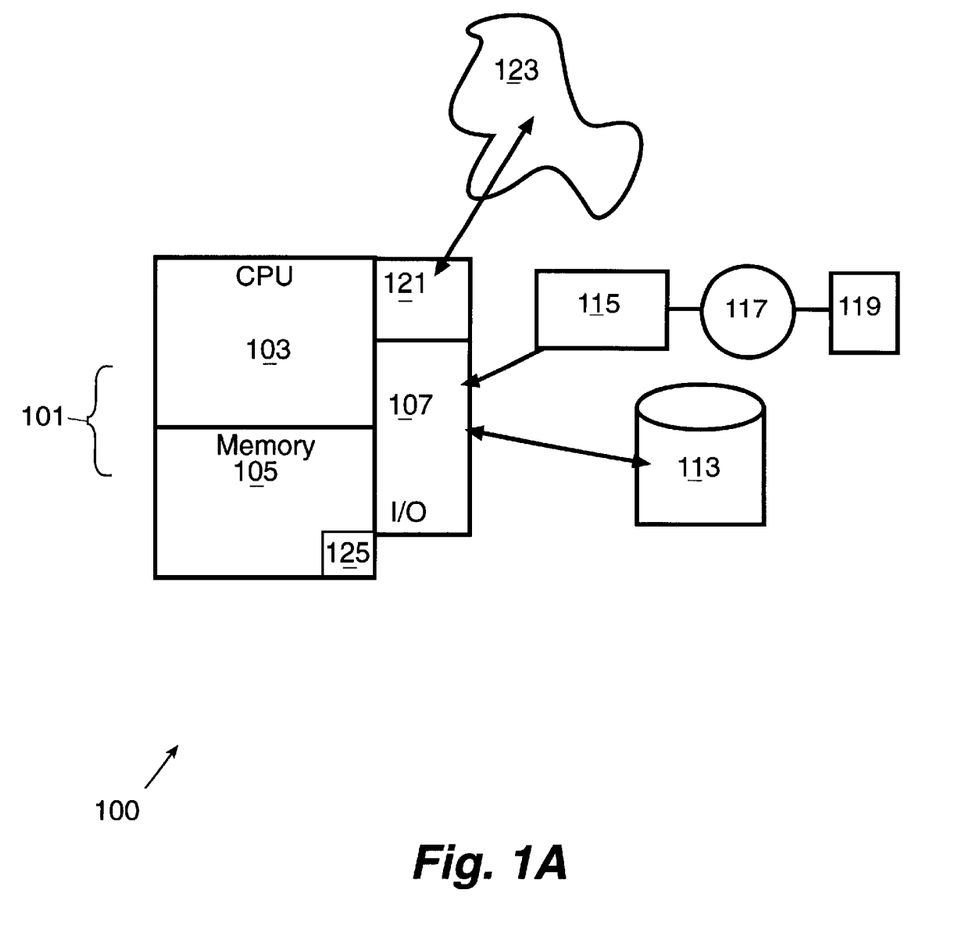
FIG. 1A illustrates a computer system capable of using the invention in accordance with a preferred embodiment.

FIG. 1A illustrates a computer, indicated by general reference character 100, that incorporates the invention. The computer 100 includes a processor 101 that incorporates a central processor unit (CPU) 103, a memory section 105 and an input/output (I/O) section 107. The I/O section 107 is connected to a disk storage unit 113 and a CD-ROM drive unit 115. The CD-ROM drive unit 115 can read a CD-ROM medium 117 that typically contains executable code and/or data 119. The CD-ROM drive unit 115 (along with the CD-ROM medium 117) and the disk storage unit 113 comprise a filestorage mechanism. Some embodiments of the invention include a network interface 121 that connects the computer 100 to a network 123. The CPU 103 executes instructions stored in the memory section 105 such as a 'program' 125. The 'program' 125 can be resident in a read only memory (not shown), loaded into the memory section 105 from the filestorage mechanism (or read only memory), or loaded into the memory section 105 from the network 123. One skilled in the art will understand that not all of the displayed features of the computer 100 need to be present for the invention. Such a one will also understand that the CD-ROM media is a removable media and can be replace by any other removable media for which the computer has a corresponding device to read that media.

Figure 1B:
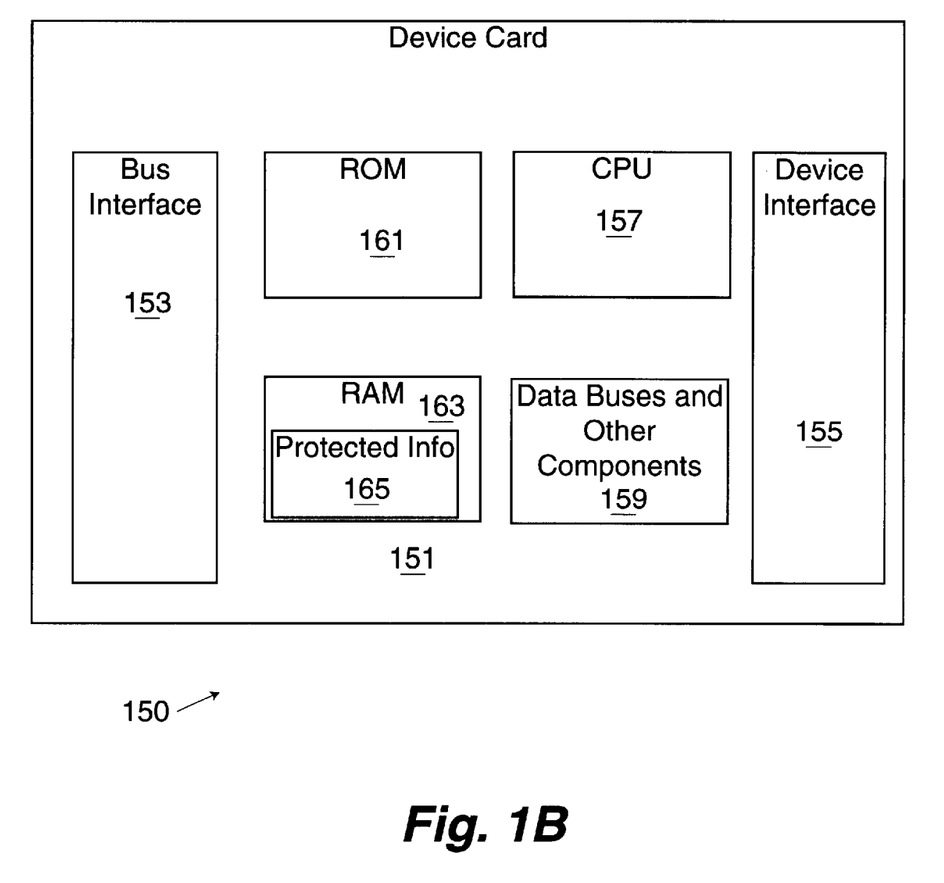
FIG. 1B illustrates a device interface card in accordance with a preferred embodiment.

FIG. 1B illustrates a device interface, indicated by general reference character 150, that contains components that effectuate the invention. The device interface 150 includes a device interface card 151 that attaches to a computer bus through a 'bus interface' portion 153. The device interface card 151 also attaches to a device (not shown) through a 'device interface' portion 155. The device interface card 151 contains a 'CPU' portion 157 that uses a 'component' portion 159 to interface to the other components on the device interface card 151. Some of these other components are a 'read only memory' portion 161, and a 'random access memory' portion 163. The 'CPU' portion 157 can execute instructions from either or both the 'read only memory' portion 161 and the 'random access memory' portion 163. The 'random access memory' portion 163 also includes a 'protected information' area 165 that contains sensitive information that has been encrypted with a tamper-resistant key.

One aspect of the invention is how to access and use the sensitive information in the 'protected information' area 165 while still making the sensitive information difficult to access through other means.

Figure 2:
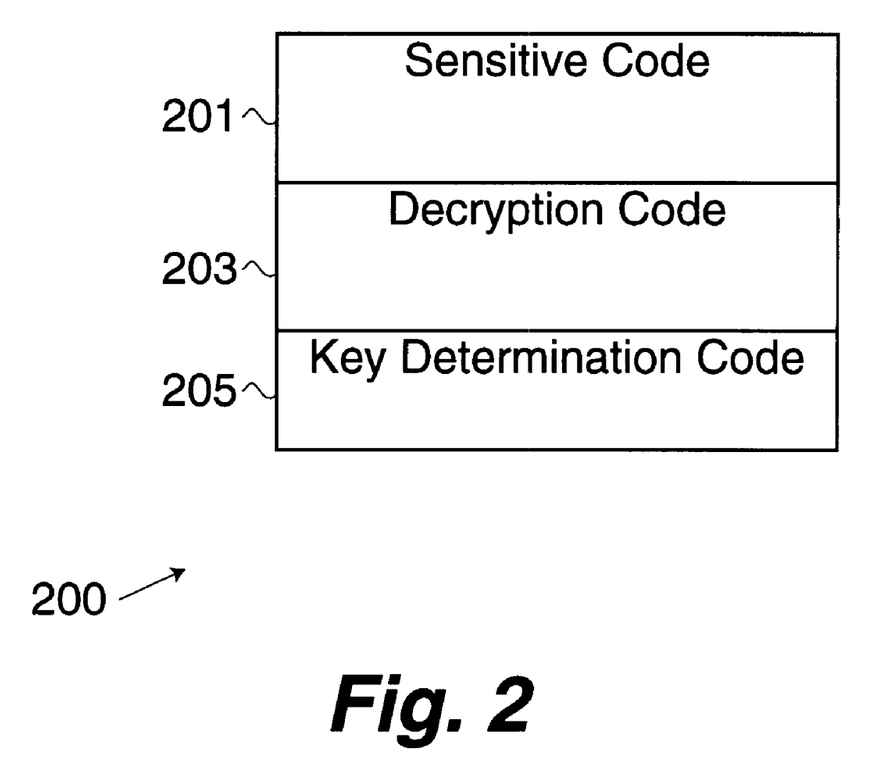
FIG. 2 illustrates memory organization in accordance with a preferred embodiment.

FIG. 2 illustrates a memory organization, indicated by general reference character 200, that can be used by a preferred embodiment. The memory organization 200 includes a sensitive code region 201, a decryption code region 203, and a key determination code region 205. The sensitive code region 201 contains instructions and data that have been encrypted by an encryption program using a tamper-resistant key. The sensitive code region 201 can be decrypted and accessed when the code in the decryption code region 203 is executed by a CPU and if the correct decryption key is provided. The key determination code region 205 includes code that is used to determine the tamper-resistant key for the sensitive code region 201. The decryption code region 203 and the key determination code region 205 determine at least one key domain.

Figure 3:
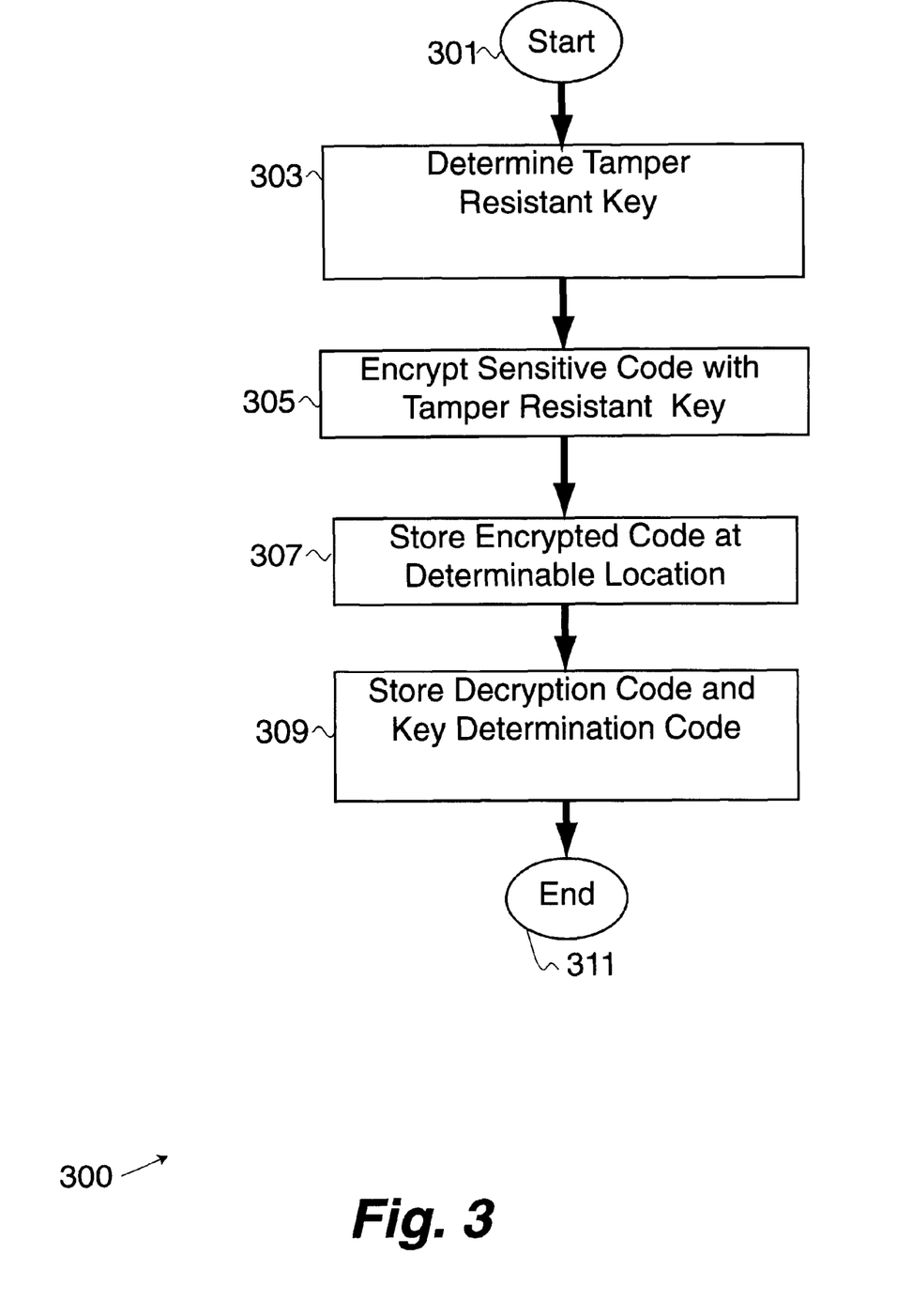
FIG. 3 illustrates an encryption process used in accordance with a preferred embodiment.

FIG. 3 illustrates an encryption process, indicated by general reference character 300, that encrypts the sensitive code region 201 and generates the memory organization 200. The encryption process 300 is preferably performed by a separate computer from the device containing the CPU that will decrypt the sensitive information. The encryption process 300 initiates at a 'start' terminal 301 and continues to a 'determine tamper-resistant key' procedure 303. The 'determine tamper-resistant key' procedure 303 uses the information that will be stored in the decryption code region 203 and/or the key determination code region 205 to generate a tamper-resistant key. Once the tamper-resistant key is determined by the 'determine tamper-resistant key' procedure 303 it is used by an 'encrypt the sensitive information' procedure 305 to encrypt the sensitive information using the tamper-resistant key to create an encrypted version of the sensitive information. The encrypted sensitive information is stored at a determinable location in storage by the 'store encrypted the sensitive information' procedure 307. A 'store decryption and key determination code' procedure 309 stores the program instruction values that make up these programs at determinable locations and so defines at least one key domain. The encryption process 300 then completes through an 'end' terminal 311.

A first domain can be defined to be a first set of program instruction values (values stored in the key determination code region 205) that can be executed to determine the tamper-resistant key. A second domain can be defined to be a second set of program instruction values (values stored in the decryption code region 203) that can be executed to decrypt the encrypted version of the sensitive information using the tamper-resistant key. Both the decryption code region 203 and the key determination code region 205 can be stored in a single domain.

The 'determine tamper-resistant key' procedure 303 accesses a key determination mechanism that generates a tamper-resistant key that is responsive to the program instruction values within at least one key domain. For example, the code and/or data stored in either or both the decryption code region 203 and the key determination code region 205.

One of the inventive concepts is to determine the value of the tamper-resistant key from the program instruction values (executable code and data) that is used to determine the tamper-resistant key and/or the program instruction values (executable code and data) that uses the tamper-resistant key to decrypt the sensitive code region 201. Thus, if an attack is made on the sensitive information by altering executable code or data in the decryption code region 203 or the key determination code region 205, the key value generated by executing instructions in the key determination code regions will be incorrect and thus, the sensitive information can not be decrypted. The alteration of the code in the key domains is often performed (for example, but without limitation) by replacing an existing computer instruction with a breakpoint instruction, a trap instruction, or a halt instruction.

Figure 4:
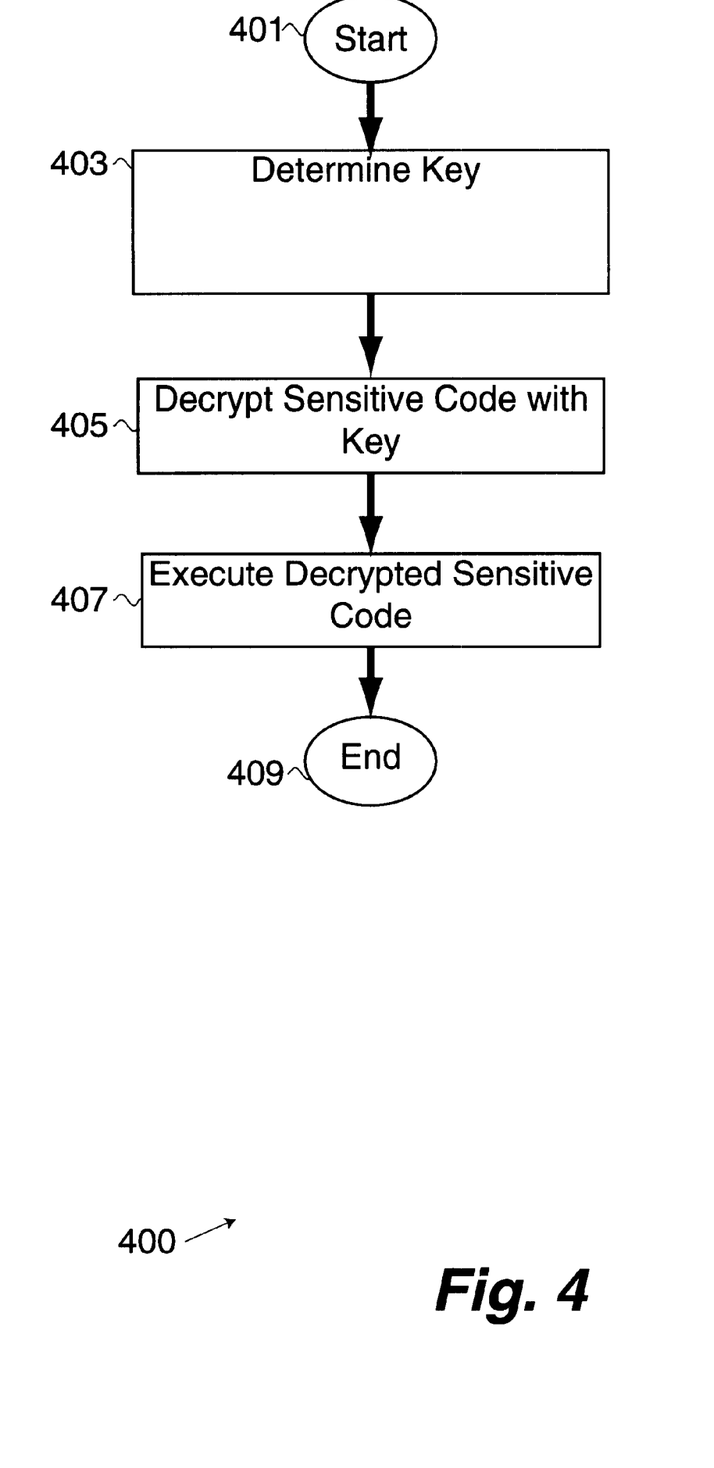
FIG. 4 illustrates an process for executing code within the sensitive information used in accordance with a preferred embodiment.

FIG. 4 illustrates a sensitive information execution process, indicated by general reference character 400, that is used to decode and execute program code contained in the sensitive information. In one embodiment, the sensitive information has been stored at a known or determinable location in a ROM. In another embodiment, the sensitive information is stored in a filesystem and is loaded into memory.

The sensitive information execution process 400 initiates at a 'start' terminal 401 and continues to a 'determine key' procedure 403. The 'determine key' procedure 403 determines a key that is a function of the program instruction values within the at least one key domain. The 'determine key' procedure 403 executes from the at least one key domain such that if the 'determine key' procedure 403 is altered due to an attack on the sensitive information, the resulting key will be different than the tamper-resistant key generated by the 'determine tamper-resistant key' procedure 303 of FIG. 3. Thus, an attempt to decrypt the sensitive information with the different key will fail. Once the key is determined, a 'decrypt sensitive information' procedure 405 attempts to decrypt the sensitive information. If the key determined by the 'determine key' procedure 403 is the same as the tamper-resistant key determined by the 'determine tamper-resistant key' procedure 303, the sensitive information is successfully decrypted. Once the sensitive information is decrypted, an 'execute the sensitive information' procedure 407 causes the CPU to execute the sensitive information to perform its protected function. The sensitive information execution process 400 completes through an 'end' terminal 409.

Similar to the encryption process described in FIG. 3, the tamper-resistant key can be determined from either or both of the key domains so long as the same domains are used to generate the key to encrypt and decrypt the sensitive information.

Figure 5:
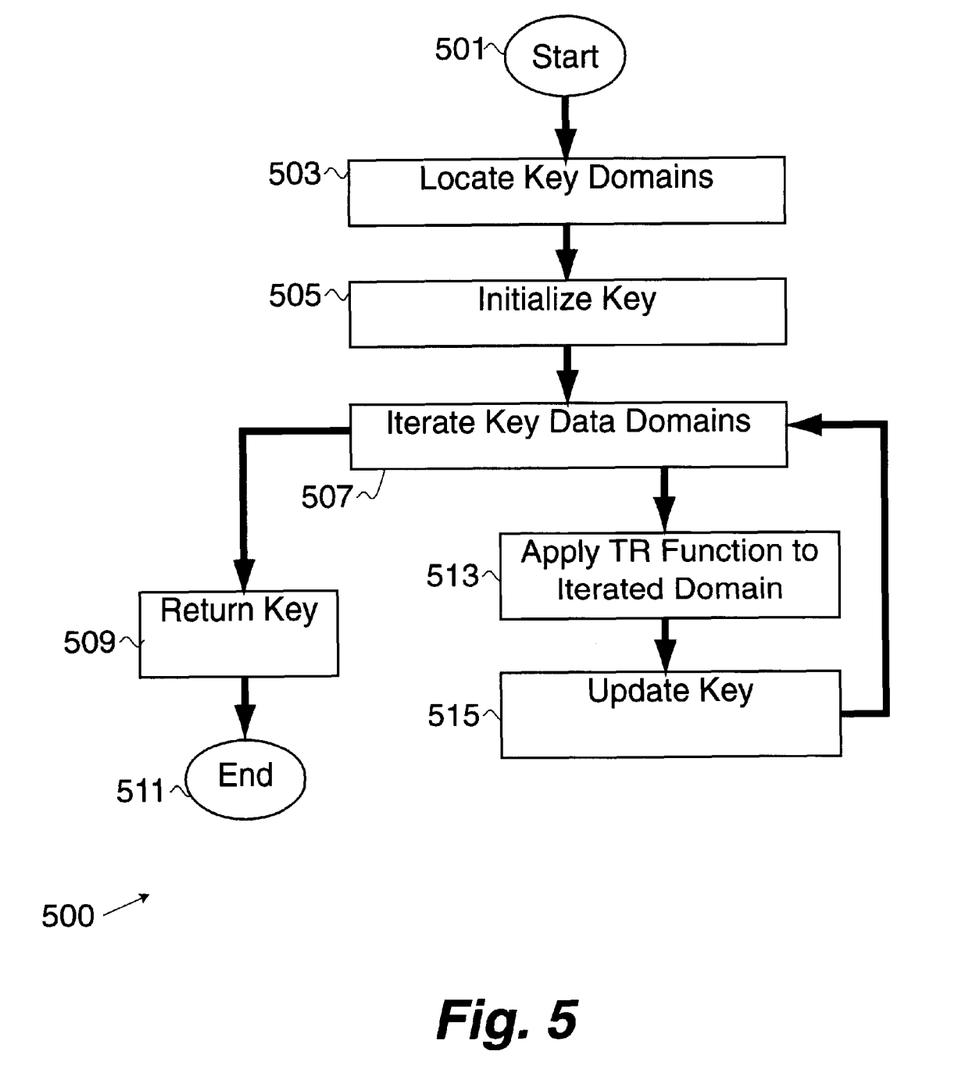
FIG. 5 illustrates a process for generating a tamper-resistance key used in accordance with a preferred embodiment.

FIG. 5 illustrates a generate tamper-resistant key process, indicated by general reference character 500, that is invoked by the 'determine key' procedure 403 and the 'determine tamper-resistant key' procedure 303 of FIG. 4 and FIG. 3. The generate tamper-resistant key process 500 initiates at a 'start' terminal 501 and continues to a 'locate key domain' procedure 503 which determines the number of key domains and their locations. An 'initialize tamper-resistant key' procedure 505 initializes the key return value. An 'iterate key domain' procedure 507 iterates over the key data domain returning appropriate data to be used in constructing the tamper-resistant key. One skilled in the art will understand that if the computer instructions within the key domain are position dependent (that is that the data values in memory change dependent on where the code is loaded in memory) that portions of the code can be normalized prior to their being processed to generate the tamper-resistant key.

After the 'iterate key domain' procedure 507 completes iterating over the data domains, the generate tamper-resistant key process 500 continues to a 'return tamper-resistant key' procedure 509 that makes the generated key available to the calling program. The generate tamper-resistant key process 500 completes through an 'end' terminal 511.

As each key domain is iterated by the 'iterate key domain' procedure 507, an 'apply the tamper-resistant key function to domain' procedure 513 operates on the data in the key domain to develop a key. In a preferred embodiment, the 'apply the tamper-resistant key function to domain' procedure 513 performs a hashing function on the data such that the key is a hash key. If the data in the key domain contains position dependent code, the data can be normalized prior to the generation of the tamper-resistant key by normalizing the position dependant addresses.

An 'update tamper-resistant key' procedure 515 then updates the key value dependant on the result of the 'apply the tamper-resistant key function to domain' procedure 513. Thus, subsequently iterated key domains update the key value. In a preferred embodiment, the key function is a hashing function.

One skilled in the art will understand that the invention provides a means to provide a tamper-resistant key for decrypting sensitive information.

From the foregoing, it will be appreciated that the invention has (without limitation) the following advantages:

1) Increases the difficulty of attacking an encryption mechanism in that the encryption key is a function of the code used to determine the key and/or the code that uses the key to decrypt sensitive information.

2) The key can be customized for each embodiment by adding a data word (for example, a serial number) to one of the key domains.

3) If an encryption attack involves changing the code in the key domain (for example, by replacing an instruction by a break point or trap instruction) the resulting key will not decrypt the sensitive information.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein.

What is claimed is:

1. A computer controlled method for encrypting sensitive information with a tamper-resistant key, said method including steps of:

at least partially determining said tamper-resistant key by applying a key determination function to values for program instructions that are to be included within at least one key domain, said program instructions to be executed to decrypt said sensitive information;

encrypting said sensitive information using said tamper-resistant key to create an encrypted version of said sensitive information; and storing said encrypted version and said program instructions;

wherein a first domain of said at least one key domain contains a first set of program instructions that can be executed to determine said tamper-resistant key based at least in part on values for said program instructions and a second set of program instructions that can be executed to decrypt said encrypted version using said tamper-resistant key.

2. The computer controlled method of claim 1 wherein said tamper-resistant key is a hash key.

3. A computer controlled method for decrypting sensitive information with a tamper-resistant key, said method including steps of:

determining said tamper-resistant key by executing program instructions included within at least one key domain so as to apply a key determination function to values for said program instructions; and decrypting an encrypted version of said sensitive information using said tamper-resistant key responsive to the step of determining;

wherein a first domain of said at least one key domain contains a first set of program instructions that are executed to determine said tamper-resistant key based at least in part on values for said program instructions and a second set of program instructions that are executed to decrypt said encrypted version using said tamper-resistant key.

4. The computer controlled method of claim 3 wherein said tamper-resistant key is a hash key.

5. An apparatus having a central processing unit (CPU) and a memory coupled to said CPU for encrypting sensitive information with a tamper-resistant key, said apparatus including:

a key determination mechanism configured to at least partially determine said tamper-resistant key by applying a key determination function to values for program instructions that are to be included within at least one key domain, said program instructions to be executed to decrypt said sensitive information;

an encryption mechanism configured to encrypt said sensitive information using said tamper-resistant key determined by the key determination mechanism to create an encrypted version of said sensitive information; and a storage mechanism configured to store said encrypted version, created by the encryption mechanism, and said program instructions;

wherein a first domain of said at least one key domain contains a first set of program instructions that can be executed to determine said tamper-resistant key based at least in part on values for said program instructions and a second set of program instructions that can be executed to decrypt said encrypted version using said tamper-resistant key.

6. The apparatus of claim 5 wherein said tamper-resistant key is a hash key.

7. An apparatus having a central processing unit (CPU) and a memory coupled to said CPU for decrypting sensitive information with a tamper-resistant key, said apparatus including:

a key determination mechanism configured to determine said tamper-resistant key by executing program instructions included within at least one key domain so as to apply a key determination function to values for said program instructions; and a decryption mechanism configured to decrypt an encrypted version of said sensitive information using said tamper-resistant key responsive to the key determination mechanism;

wherein a first domain of said at least one key domain contains a first set of program instructions that are executed to determine said tamper-resistant key based at least in part on values for said program instructions and a second set of program instructions that are executed to decrypt said encrypted version using said tamper-resistant key.

8. The apparatus of claim 7 wherein said tamper-resistant key is a hash key.

9. A computer program product including:

a computer usable storage medium having computer readable code embodied therein for causing a computer to encrypt sensitive information with a tamper-resistant key, said computer readable code including:

computer readable program code configured to cause said computer to effect a key determination mechanism configured to at least partially determine said tamper-resistant key by applying a key determination function to values for program instructions that are to be included within at least one key domain, said program instructions to be executed to decrypt said sensitive information;

computer readable program code configured to cause said computer to effect an encryption mechanism configured to encrypt said sensitive information using said tamper-resistant key determined by the key determination mechanism to create an encrypted version of said sensitive information; and computer readable program code configured to cause said computer to effect a storage mechanism configured to store said encrypted version, created by the encryption mechanism, and said program instructions;

wherein a first domain of said at least one key domain contains a first set of program instructions that can be executed to determine said tamper-resistant key based at least in part on values for said program instructions and a second set of program instructions that can be executed to decrypt said encrypted version using said tamper-resistant key.

10. The computer program product of claim 9 wherein said tamper-resistant key is a hash key.

11. A computer program product including:

a computer usable storage medium having computer readable code embodied therein for causing a computer to decrypt sensitive information with a tamper-resistant key, said computer readable code including:

computer readable program code configured to cause said computer to effect a key determination mechanism configured to determine said tamper-resistant key by executing program instructions included within at least one key domain so as to apply a key determination function to values for said program instructions; and computer readable program code configured to cause said computer to effect a decryption mechanism configured to decrypt an encrypted version of said sensitive information using said tamper-resistant key responsive to the key determination mechanisms;

wherein a first domain of said at least one key domain contains a first set of program instructions that are executed to determine said tamper-resistant key based at least in part on values for said program instructions and a second set of program instructions that are executed to decrypt said encrypted version using said tamper-resistant key.

12. The computer program product of claim 11 wherein said tamper-resistant key is a hash key.

* * * * *